United States Patent [19]

Gilberts

[11] Patent Number: 4,901,188

[45] Date of Patent: Feb. 13, 1990

[54] LINE PROTECTOR WITH SPRING

[75] Inventor: Alexander Gilberts, Algonquin, Ill.

[73] Assignee: Reliance Comm/Tec Corporation, Franklin Park, Ill.

[21] Appl. No.: 292,387

[22] Filed: Dec. 30, 1988

[51] Int. Cl.⁴ .................................... H02H 9/06

[52] U.S. Cl. .................................... 361/119; 361/124; 337/32

[58] Field of Search ............... 361/117, 118, 119, 124; 337/32

[56] References Cited

U.S. PATENT DOCUMENTS

| | | | |
|---|---|---|---|
| 3,587,021 | 7/1969 | Baumbach | 337/32 |
| 3,743,888 | 8/1972 | Baumbach | 337/32 X |
| 3,794,947 | 11/1971 | Baumbach | 337/32 |
| 3,818,271 | 3/1973 | Baumbach | 361/119 |
| 3,849,750 | 1/1974 | Baumbach et al. | 361/119 |
| 4,314,302 | 4/1980 | Baumbach | 361/119 |
| 4,317,153 | 2/1982 | Coren | 361/119 |
| 4,325,100 | 1/1980 | Baumbach | 361/119 |
| 4,334,257 | 6/1982 | Ekdahl et al. | 361/119 |
| 4,502,088 | 3/1983 | Baumbach | 361/124 |

*Primary Examiner*—Derek S. Jennings
*Attorney, Agent, or Firm*—R. A. Blackstone, Jr.

[57] ABSTRACT

A line protector module device for a communications circuit having a line protector circuit assembly including a base, a frame having a retaining portion, a spring mounted to the base, an arrester and a solder pellet compressibly held between the spring and the retaining portion of the frame. The spring is constructed of a strip of material which is formed in an S-shape. The spring has tabs formed in the material so that when the spring is subjected to a predetermined amount of compressive force, the tabs prevent nonrecoverable compression.

17 Claims, 1 Drawing Sheet

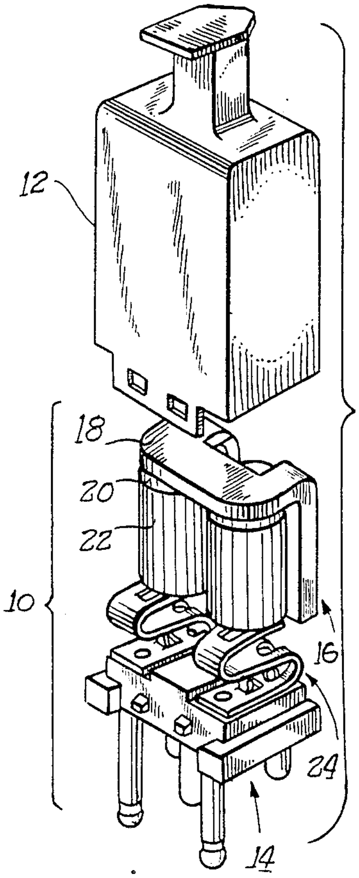
FIG. 1
FIG. 2
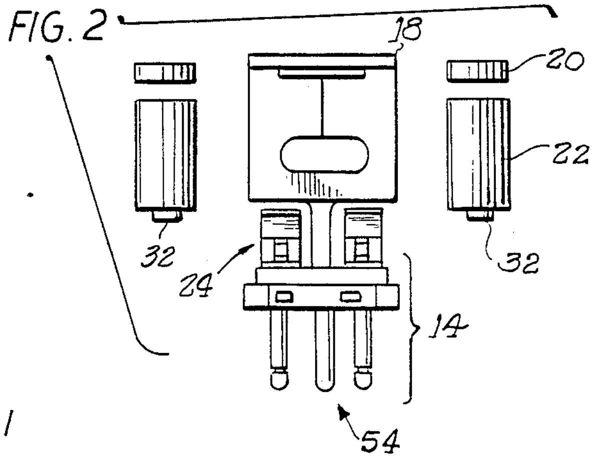
FIG. 3
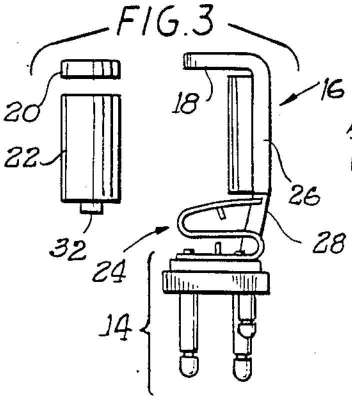
FIG 4
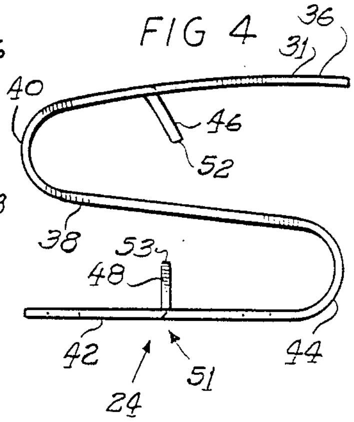
FIG. 5
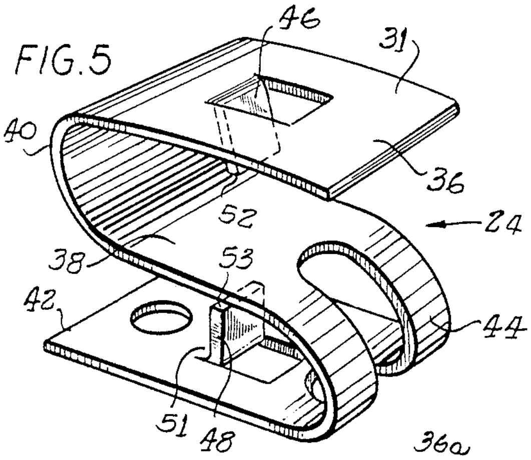
FIG. 6
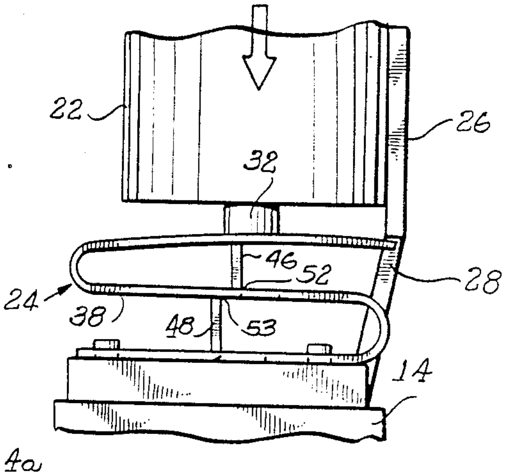
FIG. 7
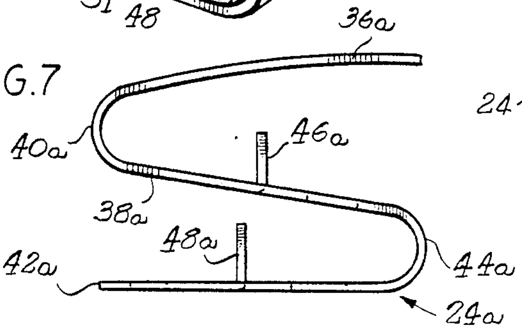

LINE PROTECTOR WITH SPRING

BACKGROUND AND SUMMARY OF THE INVENTION

This invention relates to improvements in gas discharge tube line protector modules of the type wherein a gas tube element in the line protector module is held in place by a spring which has been improved to optimize the performance of the module with respect to impact testing requirements while maintaining desired short-circuit and open circuit characteristics.

While the spring portion of the invention may be useful in a variety of applications, the ensuing description will be facilitated by specific reference to gas discharge tube line protection modules, and the problems of providing biasing means which will retain the desired compressive characteristics even after impact testing Many forms of line protector have been developed which protect wire conductors and equipment connected thereto from electrical overvoltage and/or overcurrent conditions which may result from lightening, electrical power faults, and the like. Typically, these line protectors rely on a gas tube arrester which has an arc gap across which an overvoltage is be applied. The gas tubes of the line protector module are held within a retaining frame between biasing means on the one end and a solder pellet at the other. Overvoltages of short duration will cause conduction across the arc gap to ground. After the short duration overvoltage condition is past, the protector returns to its normal nonconducting state. Under long duration overvoltage (i.e., overcurrent) periods, the solder pellet is melted, whereby the gas tube is urged against the holding bracket to create a short condition through the circuit, thereby protecting the equipment or conducting lines attached thereto. These line protectors are designed to be modular so that they can be easily replaced once they have served their purpose in protecting the lines and/or equipment.

In most prior art systems the biasing means typically used to urge the gas tube against the pellet and bracket were springs, more specifically, coiled wire springs or helically coiled metallic strips known as volute springs. Such prior art springs which were used to hold gas tubes in compression achieved their primary purpose, however the prior art springs capable of surviving standard drop test requirements under various quality control and certification procedures were very expensive. Two types of testing procedures are conducted on line protector modules. In the first test, modules are placed in a packing carton, and the carton is dropped from a standard height, usually three feet. In the second test, a single module is dropped from a standard height, usually five feet, in such a way as to land on the grounding pins. Under these tests, the prior art springs could usually survive the packing carton test, however only the more expensive volute springs tended to pass the individual module test.

Another problem with some less expensive prior art springs is that they failed the individual module drop test, since they would become terminally or nonrecoverably compressed as a result of the drop. More particularly, these springs became compressed when absorbing the continued downward movement of the gas tubes and solder pellets upon impact with the bottom test surface. However, the momentum of the gas tubes and pellets compressed the springs beyond their limit and once so compressed they could not return to their free or original uncompressed length. This resulted in an unacceptably low holding force being thereafter exerted upon the gas tube and solder pellet and the frame member, and in many cases resulted in the gas tube and solder pellet becoming dislodged from the assembly. This result was unacceptable since when the gas tube and solder pellet are dislodged from the assembly they cease to serve their functional purpose in protecting conductor lines and equipment attached thereto from overvoltages.

Another problem with the prior art springs is that in an attempt to prevent terminal compression of the springs, the springs were strengthened and made less compressible. By making the spring too strongly compressive on the gas tube and solder pellet, the line protector was potentially subjected to a short circuit condition of the type which should only occur upon melting of the solder pellet in a long duration overvoltage (i.e., overcurrent) condition. Therefore, increasing the strength of the springs did not provide a solution to the problem of over-compression (i.e., nonrecoverable compression) resulting from the drop tests.

OBJECTS OF THE INVENTION

A general object of the invention is to provide a gas tube retention spring for a line protector module which is capable of surviving individual module drop tests such that the spring will not be over-compressed or non-recoverably compressed as a result of the drop tests.

Another object of this invention is to provide a gas tube retention spring for a line protector module which will survive individual module drop tests without over-compressing or non-recoverably compressing and which will also facilitate easy assembly of the module.

In accordance with the foregoing, the present invention comprises a gas tube line protector module wherein the gas tube is retained within the module assembly with a solder pellet against a frame member. The gas tube retaining spring is of such a design as to prevent nonrecoverable compression of the spring as a result of individual module drop testing. Further, the gas tube retention spring of the invention facilitates easy assembly of the module.

BRIEF DESCRIPTION OF THE DRAWINGS

The features of the present invention which are believed to be novel are set forth with particularity in the appended claims. The organization and manner of the operation of the invention, together with the further objects and advantages thereof may best be understood by reference to the following description, taken in connection with the accompanying drawings in which like reference numerals identify like elements, and in which:

FIG. 1 is an exploded perspective view of the line protector module showing the exterior casing removed from the line protector circuit;

FIG. 2 is an exploded front elevational view showing the arresters and solder pellets removed from their mounted position within the line protector circuit assembly;

FIG. 3 is a side elevational view of the exploded view as shown in FIG. 2 further illustrating the relationship of the S-shaped biasing means to the base and frame members;

FIG. 4 is an enlarged side elevational view of an S-shaped biasing means which has been removed from the module base member;

FIG. 5 is a perspective view of the enlarged view of the S-shaped biasing means as shown in FIG. 4, further showing the details of the position and construction of stop means or tabs formed in the spring material;

FIG. 6 illustrates the line protector module at the point in the drop test where the S-shaped biasing means is at maximum compression with the tabs contacting the opposed sides of the middle leg of the S-spring while absorbing the downward momentum of the arrester and solder pellet; and FIG. 7 is a perspective view of an alternative form of the S-shaped biasing means.

DETAILED DESCRIPTION OF THE ILLUSTRATED EMBODIMENT

While this invention is susceptible to embodiment in many different forms, there is shown in the drawings and will be herein described in detail one specific embodiment with the understanding that the present disclosure is to be considered an exemplification of the principles of the invention, and is not intended to limit the invention to the embodiment illustrated.

FIG. 1 is an exploded, perspective view of a line protector module 10 showing an exterior line protector module casing 12 removed therefrom. As shown in FIG. 1, the line protector module 10 includes a base member 14 to which is mounted a frame member 16, having a retaining portion 18. Biasing means or spring 24 mounted to the base member 14 retains solder pellets 20 and arresters 22 compressed against the retaining portion 18. The protector module is connected in circuit (as will be more fully described later herein) such that short circuiting the arrester will short circuit connected equipment or lines to ground.

As shown in the exploded front elevational view of FIG. 2, the line protector module 10 is constructed and assembled to compressibly retain the arrester 22 and the solder pellet 20 between the downwardly facing surface of the retaining portion 18 of the frame member 16 and the upwardly facing portion of the spring 24. The spring 24 compressibly retains the solder pellet 20 and arrester 22 in this position Accordingly, an overvoltage of a short duration momentarily grounds the circuit by jumping an arc gap within the arrester 22 thereby preventing damage to equipment connected to the arrester. For overvoltages of longer duration (i.e., overcurrent), the solder pellet 20 positioned on the top side of the arrester 22 melts, allowing the spring 24 to urge the arrester 22 upwardly thus directly contacting a back portion 26 of the frame member 16 and creating a short circuit to protect any equipment connected thereto.

In the present embodiment, the frame member 16 is formed of a piece of metal, and as best shown in FIG. 3, this piece of metal is formed generally in an L-shape, creating a back portion 26, a pin portion 28, and the retaining portion 18. As best shown in FIG. 2, the back portion 26 has an arrester securing portion 30, which is generally concavely curved to complement the generally convex exterior curvature of the cylindrically shaped arrester 22. The pin portion 28 of the frame member 16 projects generally perpendicularly through the base member 14. The frame member 16 is formed from a conductive material which can be formed such as metal, and the base member 14 is formed of a rigid nonconductive material such as plastic. As best shown in FIG. 3, the arrester 22 has a protruding contacter 32 formed on the downwardly projecting end which contacts the upwardly facing surface 31 on the top of the spring 24.

FIG. 4 shows an enlarged side elevational view of the spring 24 shown in FIGS. 1–3. The biasing means is generally a flat planar strip of material formed into an S-shape with stop means 34 operatively coupled thereto. In the embodiment illustrated in FIG. 4, the biasing means 24 is shown to be generally S-shaped, having a top leg 36 connected to a middle leg 38 by a top curved portion 40, and a bottom leg 42 attached to the middle leg 38 by a bottom curved portion 44. The stop means 34 of this configuration comprise two opposedly facing tabs 46, 48. Each of these tabs 46, 48 is formed in the S-shaped strip of material by striking out and bending a portion of the material away from the general plane of the respective leg of the material. The top tab 46 is formed by striking out and bending a portion of the top leg 36 downwardly away from the top leg 36 towards the middle leg 38. A bottom tab 48 is formed by striking out and bending the material away from the bottom leg 42 upwardly towards the middle leg 38.

The perspective view of the spring 24 as shown in FIG. 5 shows the generally rectilinear shape of the top tab 46 and bottom tab 48. Alternatively, the tab 46, 48 may be formed of independent pieces of material and be attached to the appropriate surfaces of the S-shaped biasing means 24 without departing from the invention. Additionally, while the top tab 46 and the bottom tab 48 may be of shapes other than a generally rectilinear shape, as in the illustrated embodiment, this shape is generally preferred since it provides sufficiently strong retained common edges 50, 51 as well as contacting edges 52, 53 which perpendicularly contact the opposing surfaces of the middle leg 38 when the spring 24 is sufficiently compressed. The spring 24 is formed of metal which can be formed in the manner illustrated while still retaining spring-like characteristics.

When the line protector module 10 is assembled as shown in FIG. 1, the spring 24 retains the arrester 22 and solder pellet 20 against the retaining portion 18 of the frame member 16. Projecting downwardly through the base member 14 is a series of conductive plug-in terminal pins 54. The pins 54 provide a conductive connection, a grounding connection and module polarization. When the line protector module 10 is tested, the testing procedure requires that the circuit assembly be dropped from a specific height such that the pins 54 generally perpendicularly impact a hard horizontal surface.

FIG. 6 illustrates the line protector module 10 at a point in the drop test where the S-shaped spring 24 is at maximum compression with the contacting edges 52, 53 of the top tab 46 and bottom tab 48 contacting the upwardly facing surface 56 and downwardly facing surface 58 of the middle leg 38 respectively. Since the tabs 46, 48 contact the middle leg 38 upon application of a predetermined amount of compressive force thereto, the tabs 46, 48 thereby prevent the spring 24 from being nonrecoverably compressed. In contrast, in a drop test required for this type of unit, the downward momentum of the arrester 22 creates a force when the pins 54 contact the rigid surface which is capable of nonrecoverably compressing such S-shaped biasing means without such tabs 46, 48 or other equivalent means provided therefor.

FIG. 7 is a perspective view of an alternative embodiment of the S-shaped spring 24. Elements in FIG. 7 which are the same as or similar to elements of the preferred embodiment as shown in FIG. 5 are identified by the same reference numbers with the addition of the suffix a. As shown in FIG. 7, the spring 24a is formed with a top tab 46a and a bottom tab 48a. The top tab 46a is formed in the middle leg 38a projecting upwardly away from the middle leg 38a. The bottom tab 48a is formed in the bottom leg 42a and projects upwardly and away from and generally perpendicularly to the bottom leg 42a. The tabs 46a, 48a are dimensioned and positioned on the middle leg 38a and bottom leg 42a respectively, such that when the biasing means or spring 24a is sufficiently compressed, the tabs 46a, 48a will neither interlock nor interfere with the recovery recoil of the spring 24a once the compressive forces are released. For example, in this embodiment, the top tab 46a may be dimensioned to be smaller than the bottom tab 48a such that when the spring 24a is compressed, the bottom tab 48a is incapable of projecting through the rectangular aperture 60 created by striking out and bending upwardly the top tab 46a from the biasing means material.

An additional embodiment is generally formed by merely inverting the embodiment as shown in FIG. 7. That is, in this third embodiment, the tabs are positioned such that a top tab is formed in the top leg 36a and projects downwardly and away from the top leg 36a and a bottom tab is formed in the middle leg 38a and projects downwardly and away from the middle leg 38a.

In use, the frame member 16 and spring 24 are attached to the base member 14 with the retaining portion 18 of the frame member 16 and the spring 24 forming a space therebetween for retaining the arrester 22 and solder pellet 20. The solder pellet 20 is positioned on top of the arrester 22 and the two are compressibly positioned between the downwardly facing surface of the retaining portion 18 and the upwardly facing surface 31 of the top leg 36 of the spring 24. Thus positioned, the arrester 22 and solder pellet 20 are securely compressibly retained within the line protector module 10. When the line protector module 10 is dropped, either during testing or during ordinary use, the tabs 46, 48 formed in the spring 24 prevent nonrecoverable compression of the spring 24. When sufficiently compressed, the tabs 46, 48 contact opposedly facing surfaces thereby maintaining a desired degree of compression on the solder pellet 20 and arrester 22 contained therein, while preventing the arrester 22 and solder pellet 20 from being either overcompressed so as to short circuit, or undercompressed, so as to be released from the line protector module 10.

While particular embodiments of the present invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein, but should be defined by the appended claims and equivalents thereof. Accordingly, the aim in the appended claims is to cover all such changes and modifications as fall within the true spirit and scope of the invention.

The invention is claimed as follows:

1. A line protector module device for a communications circuit comprising:

a base member, a frame member having a retaining portion, biasing means mounted to said base member, and an arrester and a solder pellet compressibly contained between said biasing means and said retaining portion of said frame member;

said biasing means further comprising a strip of material which is formed in an S-shape for compressing said arrester and said solder pellet against said retaining portion of said frame member, and stop means operatively coupled with said biasing means for preventing nonrecoverable compression of said S-shaped strip of material.

2. A device according to claim 1 wherein said strip of material is generally a flat planar strip formed into an S-shape and wherein said stop means comprise at least one tab which is formed in said S-shaped strip of material retaining at least one common edge with a given surface of said strip of material by striking out and bending a portion of the material of said strip forming said tab away from the surface of said strip in which said tab is formed.

3. A device according to claim 2 wherein said strip of material is formed with a major axis and said material is formed into an S-shape along said major axis, and said tab is generally rectilinear in shape with said retained common edge generally perpendicular to said major axis of said S-shaped strip of material.

4. A device according to claim 2 wherein said stop means comprise at least two tabs which are formed in different surfaces of said S-shaped strip of material and are bent away from said different surfaces of said S-shaped strip of material to positions generally perpendicular to the respective surfaces of said strip from which said tabs are formed.

5. A device according to claim 4 wherein said S-shaped strip of material is formed with three legs; a top leg, a middle leg and a bottom leg; said middle leg having one end attached to said top leg by a top curved portion and said middle leg having an opposite end attached to said bottom leg by a bottom curved portion; a first of said tabs being formed in said top leg and projecting downwardly and away from said top leg toward said middle leg of said S-shaped strip of material; and a second of said tabs being formed in said bottom leg projecting upwardly and away from said bottom leg toward said middle leg of said S-shaped strip of material; said first and second tabs abutting opposed surfaces of said middle leg upon application of a predetermined amount of compressive force to the device to thereby prevent said nonrecoverable type of compression.

6. A device according to claim 4 wherein said S-shaped strip of material is formed with three legs; a top leg, a middle leg and a bottom leg; said middle leg having one end attached to said top leg by a top curved portion and said middle leg having an opposite end attached to said bottom leg by a bottom curved portion; a first of said tabs being formed in the middle leg of said S-shaped strip projecting downwardly and away from said middle leg of said S-shaped strip of material; and a second of said tabs being formed in said top leg of said S-shaped strip projecting downwardly and away from said top leg toward the middle leg of said S-shaped strip said first tab abutting an upwardly facing surface of said bottom leg and said second tab abutting an upwardly facing surfaces of said middle leg upon application of a predetermined amount of compressive force to the device to thereby prevent said nonrecoverable type of compression.

7. A device according to claim 4 wherein said S-shaped strip of material is formed with three legs; a top leg, a middle leg and a bottom leg; said middle leg having one end attached to said top leg by a top curved portion and said middle leg having an opposite end attached to said bottom leg by a bottom curved portion; a first of said tabs being formed in the middle leg of said S-shaped strip projecting upwardly and away from said middle leg of said S-shaped strip of material; and a second of said tabs being formed in said bottom leg of said S-shaped strip projecting upwardly and away from said bottom leg toward the middle leg of said S-shaped strip of material; said first tab abutting a downwardly facing surface of said top leg and said second tab abutting a downwardly facing surface of said middle leg upon application of a predetermined amount of compressive force to the device to thereby prevent said nonrecoverable type compression.

8. A device according to claim 2 wherein said strip of material is made of metal.

9. A device according to claim 1 wherein a plurality of biasing means independently compressibly maintain a corresponding plurality of arresters and solder pellets between a corresponding plurality of retaining portions of said frame member attached to said base member.

10. An improved biasing means for a line protector module of the type including an arrester, a frame member having a retaining portion, a solder pellet, and a base member which mounts the frame member and biasing means, wherein said biasing means compressibly retains said arrester and said solder pellet between said biasing means and retaining portion of said frame member; said improved biasing means comprising;

a strip of material which is formed in an S-shape for compressing said arrester against said retaining portion of said frame member, and stop means operatively coupled with said biasing means to prevent nonrecoverable compression of said S-shaped strip of material.

11. A device according to claim 10 wherein said strip of material is generally a flat planar strip formed into an S-shape and wherein said stop means comprise at least one tab which is formed in said S-shaped strip of material retaining at least one common edge with a given surface of said strip of material by striking out and bending a portion of the material of said strip forming said tab away from the surface of said strip in which said tab is formed.

12. A device according to claim 11 wherein said strip of material is formed with a major axis and said material is formed into an S-shape along said major axis, and said tab is generally rectilinear in shape with said retained common edge generally perpendicular to said major axis of said S-shaped strip of material.

13. A device according to claim 11 wherein said stop means comprise at least two tabs which are formed in different surfaces of said S-shaped strip of material and are bent away from said different surfaces of said S-shaped strip of material to positions generally perpendicular to the respective surfaces of said strip from which said tabs are formed.

14. A device according to claim 11 wherein said S-shaped strip of material is formed with three legs; a top leg, a middle leg and a bottom leg; said middle leg having one end attached to said top leg by a top curved portion, and said middle leg having an opposite end attached to said bottom leg by a bottom curved portion; the first of said tabs being formed in said top leg and projecting downwardly and away from said top leg toward said middle leg of said S-shaped strip of material; and a second of said tabs being formed in said bottom leg projecting upwardly and away from said bottom leg toward said middle leg of said S-shaped strip of material; said first and second tabs abutting opposed surfaces of said middle leg upon application of a predetermined amount of compressive force to the device, to thereby prevent said nonrecoverable type of compression.

15. A device according to claim 11 wherein said S-shaped strip of material is formed with three legs; a top leg, a middle leg and a bottom leg; said middle leg having one end attached to said top leg by a top curved portion and said middle leg having an opposite end attached to said bottom leg by a bottom curved portion; a first of said tabs being formed in the middle leg of said S-shaped strip projecting downwardly and away from said middle leg of said S-shaped strip of material; and a second of said tabs being formed in said top leg of said S-shaped strip projecting downwardly and away from said top leg toward the middle leg of said S-shaped strip; said first tab abutting an upwardly facing surface of said bottom leg and said second tab abutting an upwardly facing surface of said middle leg upon application of a predetermined amount of compressive force to the device to thereby prevent said nonrecoverable type of compression.

16. A device according to claim 11 wherein said S-shaped strip of material is formed with three legs; a top leg, a middle leg and a bottom leg; said middle leg having one end attached at one end to said top leg by a top curved portion and said middle leg having an opposite end attached to said bottom leg by a bottom curved portion; a first of said tabs being formed in the middle leg of said S-shaped strip projecting upwardly and away from said middle leg of said S-shaped strip of material; and a second of said tabs being formed in said bottom leg of said S-shaped strip projecting upwardly and away from said bottom leg toward the middle leg of said S-shaped strip of material; said first tab abutting a downwardly facing surface of said top leg and said second tab abutting a downwardly facing surface of said middle leg upon application of a predetermined amount of compressive force to prevent said nonrecoverable type of compression.

17. A device according to claim 11 wherein said strip of material is made of metal.

* * * * *